United States Patent
Kitajima et al.

(10) Patent No.: US 12,233,358 B2
(45) Date of Patent: Feb. 25, 2025

(54) FILTER DEVICE

(71) Applicant: YAMASHIN-FILTER CORP., Kanagawa (JP)

(72) Inventors: Nobuyuki Kitajima, Kanagawa (JP); Nobuki Sasaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 372 days.

(21) Appl. No.: 17/727,948

(22) Filed: Apr. 25, 2022

(65) Prior Publication Data

US 2022/0241703 A1 Aug. 4, 2022

Related U.S. Application Data (63) Continuation of application No. PCT/JP2020/041192, filed on Nov. 4, 2020.

(30) Foreign Application Priority Data

Nov. 8, 2019 (JP) .................. 2019-203530

(51) Int. Cl.
*B01D 29/15* (2006.01)

(52) U.S. Cl.
CPC ........ *B01D 29/15* (2013.01); *B01D 2201/291* (2013.01); *B01D 2201/52* (2013.01); *B01D 2201/56* (2013.01)

(58) Field of Classification Search
CPC .............. B01D 29/15; B01D 2201/291; B01D 2201/52; B01D 2201/56; B01D 29/606;
(Continued)

(56) References Cited

U.S. PATENT DOCUMENTS

2011/0089091 A1 4/2011 Grass et al.
2012/0303204 A1* 11/2012 Narisako .............. B01D 36/005
701/29.6
(Continued)

FOREIGN PATENT DOCUMENTS

CN 204637737 U 9/2015
EP 3315183 A1 5/2018
(Continued)

OTHER PUBLICATIONS

Extended European Search Report issued in European Patent Application No. 20886045.2, mailed on Nov. 25, 2022 (7 pages).
(Continued)

*Primary Examiner* — Madeline Gonzalez
(74) *Attorney, Agent, or Firm* — Nakanishi IP Associates, LLC (57) ABSTRACT

A head made of metal is provided covering an opening of a filter case, and a filtration member having a tubular shape is provided in an internal space formed by the filter case and the head. A plate made of metal is provided near the opening of the filter case, and an IC tag is provided between the filtration member and the plate. The head is provided with an antenna unit including an antenna section including an antenna configured to communicate with the IC tag. The antenna unit includes a case having a rod shape and at least partially inserted into the head, the antenna section is provided adjacent to a first end corresponding to one end of the case, the case is provided in the head such that the antenna section is exposed when the head is viewed from a side of the filter case, and the plate is provided with an aperture from which the IC tag is exposed.

12 Claims, 8 Drawing Sheets

(58) Field of Classification Search
CPC .. B01D 29/608; B01D 35/143; B01D 35/153; B01D 35/16; B01D 2201/303; B01D 46/00; B01D 46/42
USPC ...................... 210/323.2, 455, 442, 444, 103
See application file for complete search history.

(56) References Cited

U.S. PATENT DOCUMENTS

| | | |
|---|---|---|
| 2018/0117508 A1 | 5/2018 | Paluszewski et al. |
| 2019/0076760 A1 | 3/2019 | Surdick et al. |
| 2019/0083909 A1* | 3/2019 | Remboski ............ B01D 35/143 |
| 2020/0298148 A1 | 9/2020 | Kitajima |

FOREIGN PATENT DOCUMENTS

| | | |
|---|---|---|
| JP | 2007-537870 A | 12/2007 |
| JP | 2011-506842 A | 3/2011 |
| JP | 2019-115879 A | 7/2019 |
| WO | 00/32298 A1 | 6/2000 |
| WO | 2005/113112 A1 | 12/2005 |
| WO | 2014/203377 A1 | 12/2014 |
| WO | 2015/002307 A1 | 1/2015 |
| WO | 2019/131263 A1 | 7/2019 |

OTHER PUBLICATIONS

International Search Report issued in PCT/JP2020/041192 mailed on Jan. 12, 2021 with English Translation (5 pages).
Written Opinion of International Searching Authority issued in PCT/JP2020/041192 mailed on Jan. 12, 2021 with English Translation (5 pages).

* cited by examiner

FILTER DEVICE

CROSS-REFERENCE TO RELATED APPLICATIONS

This application is a continuation application of International Patent Application No. PCT/JP2020/041192 filed on Nov. 4, 2020, which claims priority to Japanese Patent Application No. 2019-203530 filed on Nov. 8, 2019, the entire contents of which are incorporated by reference.

TECHNICAL FIELD

The present invention relates to a filter device.

BACKGROUND ART

Patent Document 1 discloses a filter device including: a filter element in which an IC tag is provided inside an upper plate provided covering an upper end face of a filtration member; and an antenna provided on a lid body covering a case into which the filter element is inserted.

CITATION LIST

Patent Literature

Patent Document 1: JP 2019-115879 A

In recent years, there has been a demand to attach an IC tag to a filter element in order to prevent mounting of an imitation and to manage an operating time and the like. However, there has been a problem in that in a case where a housing including a lid body and the like is made of metal, radio waves are reflected by the metal or a magnetic flux otherwise passing through a loop antenna constituting the antenna is restrained from passing through, thus suppressing detection of the IC tag.

SUMMARY OF INVENTION

In the light of these circumstances, one or more embodiments of the present invention provide a filter device that can detect an IC tag even in a case where metal is used for a housing.

A filter device according to one or more embodiments of the present invention includes a filter case having a tubular shape and including an opening at one of an upper end or a lower end of the filter case, with the other end being covered, a head made of metal and provided in the filter case to cover the opening, a filtration member having a tubular shape and provided in an internal space formed by the filter case and the head, a plate made of metal and provided near the opening of the filter case, an IC tag provided between the filtration member and the plate, and an antenna unit provided in the head and provided with an antenna section including an antenna configured to communicate with the IC tag, wherein the antenna unit includes a case having a rod shape and at least partially inserted into the head, the antenna section is provided adjacent to a first end corresponding to one end of the case, the case is provided in the head such that the antenna section is exposed when the head is viewed from a side of the filter case, and the plate is provided with an aperture from which the IC tag is exposed.

According to one or more embodiments of the filter device according to the present invention, the head made of metal is provided covering the opening of the filter case, and the filtration member having a tubular shape is provided in the internal space formed by the filter case and the head. The plate made of metal is provided near the opening of the filter case, and the IC tag is provided between the filtration member and the plate. The head is provided with the antenna unit including the antenna section including the antenna configured to communicate with the IC tag. The antenna unit includes a case having a rod shape and at least partially inserted into the head, the antenna section is provided adjacent to the first end corresponding to one end of the case, the case is provided in the head such that the antenna section is exposed when the head is viewed from the filter case side, and the plate is provided with an aperture from which the IC tag is exposed. This allows the IC tag to be detected even in a case where metal is used for the housing (plate and head).

In this regard, the IC tag may have a hollow disk shape, the plate may be provided with a plurality of the apertures, and centers of the plurality of apertures may be evenly arranged along a circle centered at a center axis of the filter case and having a diameter larger than an inner diameter of the IC tag and smaller than an outer diameter of the IC tag. This allows the antenna unit to be provided at any position of the head. Also, the plate and the head need not be positioned.

In this regard, the antenna may have a plate shape, and the case may be provided in the head such that the antenna section faces the plate and that the antenna and the aperture overlap when viewed along the center axis of the filter case. This reduces the distance between the antenna and the IC tag, facilitating communication between the antenna and the IC tag.

In this regard, the filter case may be made of metal, the plate may be provided covering the opening, and the filter case, the filtration member, the plate, and the IC tag may be integrated together and may be detachable from the head. This allows the IC tag to be detected even in a form in which a cartridge including the housing (filter case and plate) made of metal, the cartridge provided with the filtration member and the IC tag, is attached to the head, for example, in a fuel filter.

In this regard, the antenna unit may include a measurement section measuring a pressure or temperature of a space formed by the filter case and the head, and the measurement section may be provided inside the case and closer to a root side of the case than the antenna. This allows functions of both the antenna and the measurement section to be achieved in a compatible manner, and the measurement section and the antenna can be provided in the filter device simply by attaching one member (antenna unit).

In this regard, the antenna unit may include a cover formed of a material that is elastically deformable, and the cover may include an insertion section having a bottomed tube shape and internally provided with the antenna (the antenna is arranged inside the insertion section), and when the cover is provided in the case, an opening of the insertion section may be covered by the case. Thus, the antenna is covered by the cover and is prevented from contacting the liquid, thus facilitating reading of the IC tag.

According to one or more embodiments of the present invention, the IC tag can be detected even in a case where metal is used for the housing.

DESCRIPTION OF EMBODIMENTS

Hereinafter, embodiments of the present invention will be described in detail with reference to the drawings. In the embodiments below, as an example, a fuel filter will be described that removes dust, moisture, and the like contained in a liquid such as fuel, hydraulic oil, and the like. However, the filter device of the present invention is not limited to a fuel filter, and can be used for, for example, a urea water filter or an air breather. Additionally, in the present embodiment, fuel will be described as an example of a liquid to be filtered. However, the liquid to be filtered is not limited to fuel.

First Embodiment

Figure 1:
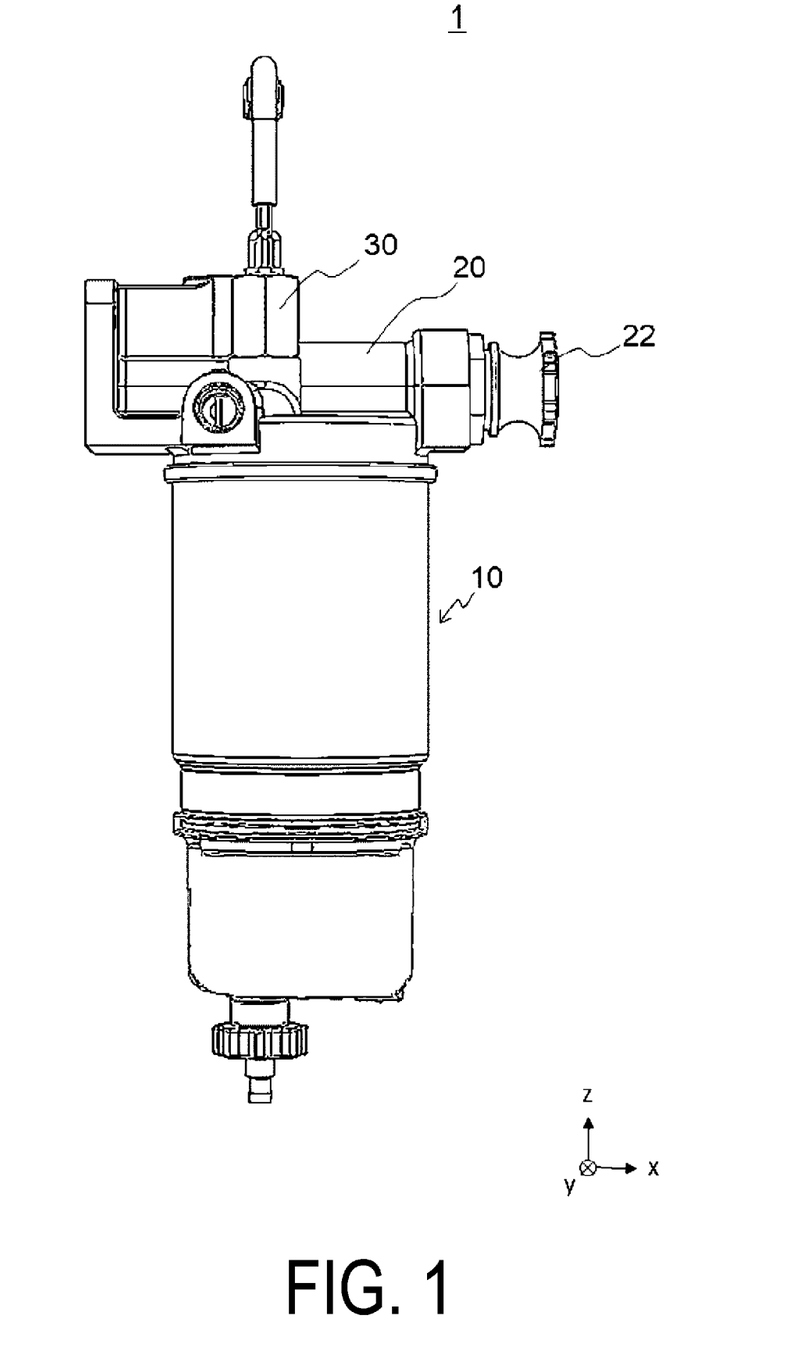
FIG. 1 is a side view schematically illustrating a fuel filter 1 according to an embodiment of the present invention.

FIG. 1 is a cross-sectional view schematically illustrating a fuel filter 1 according to an embodiment of the present invention. The fuel filter 1 mainly includes a cartridge 10, a head 20, an antenna unit 30, and an IC tag 40 (described below in detail). A plate 12 of the cartridge 10 (described below in detail) and the head 20 correspond to a housing of the fuel filter 1, and are made of metal. As the metal, any of various metals having high corrosion resistance can be used, for example, stainless steel.

The head 20 is provided on the upper side (+z side) of the cartridge 10 and feeds fuel to the cartridge 10 or discharges fuel from the cartridge 10. The antenna unit 30 is provided in the head 20.

Figure 2:
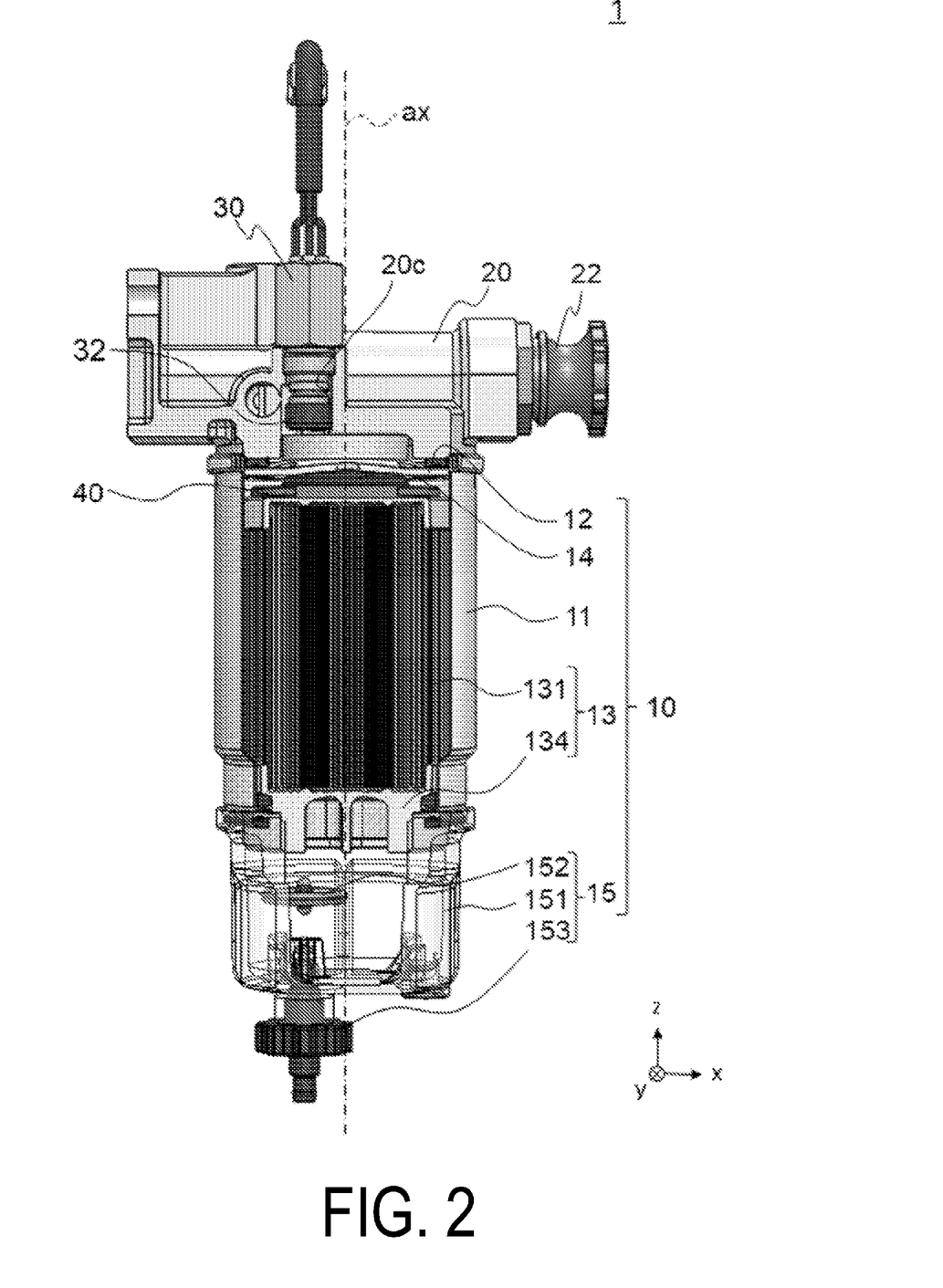
FIG. 2 is a side view schematically illustrating the fuel filter 1.
Figure 3:
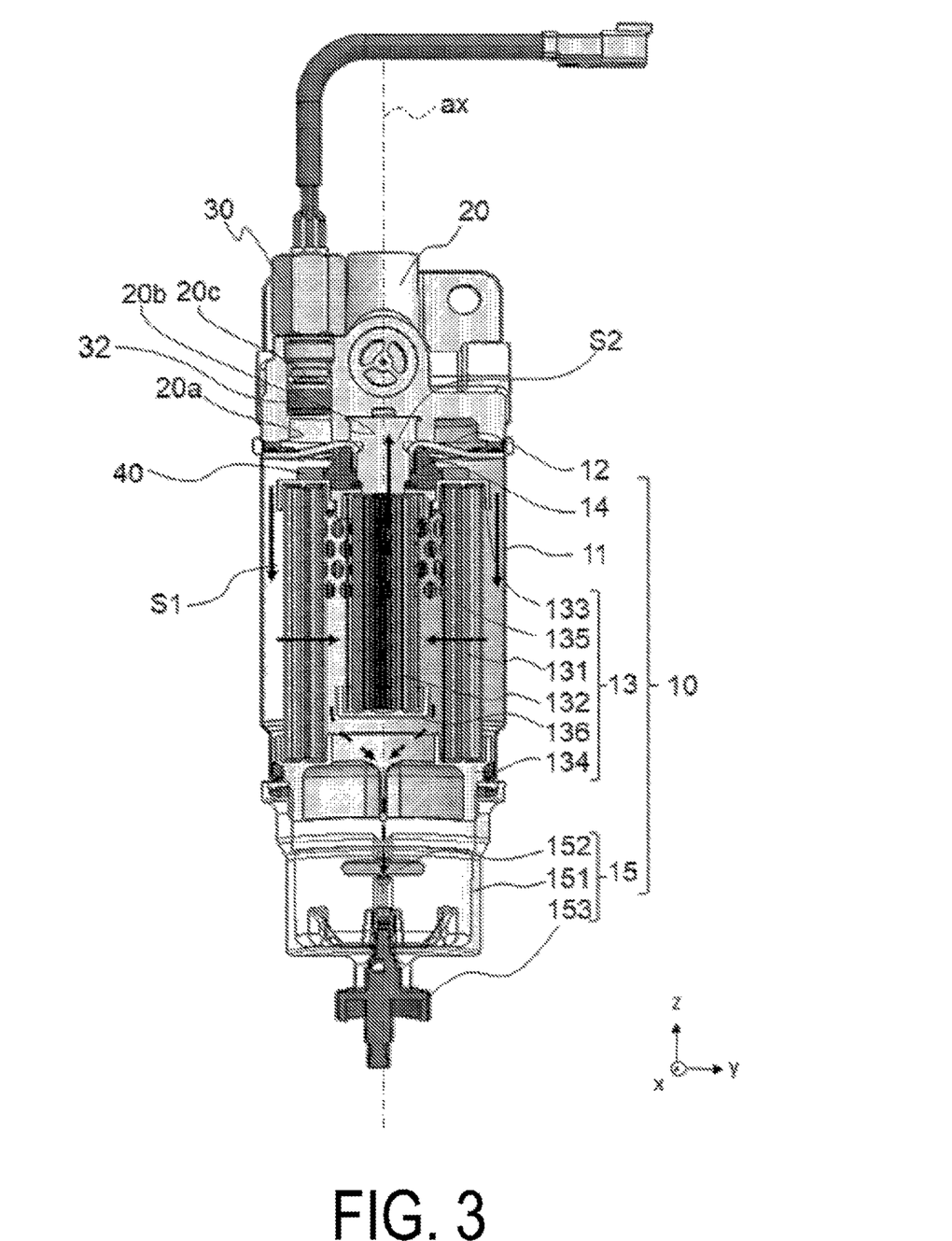
FIG. 3 is a cross sectional view schematically illustrating the fuel filter 1.

FIG. 2 is a side view schematically illustrating the fuel filter 1. In FIG. 2, a part of the cartridge 10 is cut off, and the head 20 is illustrated in cross section. FIG. 3 is a cross sectional view schematically illustrating the fuel filter 1. In FIGS. 2 and 3, the antenna unit 30 is not illustrated in cross section.

The cartridge 10 mainly includes a filter case 11, the plate 12, a filter element 13, a mounting member 14, and a reservoir section 15. The IC tag 40 is provided inside the cartridge 10. The filter case 11, the plate 12, the filter element 13, the mounting member 14, the reservoir section 15, and the IC tag 40 are integrated together and are detachable from the head 20.

The filter case 11 has a substantially tubular shape (in this case, a substantially cylindrical shape), and is formed of a metal. The filter case 11 includes an opening at an upper end of the filter case 11. A lower end of the filter case 11 is covered. However, the filter case 11 need not be formed of metal, and may be formed of a resin, for example.

The plate 12 is provided near the opening at the upper end of the filter case 11. In the present embodiment, the plate 12 covers the opening at the upper end of the filter case 11. The plate 12 has a plate shape, and is formed of metal.

The opening at the lower end of the filter case 11 is covered by the reservoir section 15. The reservoir section 15 mainly includes a case 151, a float 152, and a drain plug 153.

The case 151 is a member in which moisture separated by the filter element 13 is collected, and is formed using a transparent resin. The float 152 is sealed inside the case 151. The float 152 is formed to float on a water surface. The drain plug 153 is provided at a lower portion of the case 151. When the drain plug 153 is removed, the moisture collected in the case 151 is discharged to the outside.

The filter element 13 is provided in an internal space formed by the filter case 11 and the head 20. The filter element 13 mainly includes filtration members 131 and 132, and plates 133, 134, 135, and 136.

The filtration members 131 and 132 are each formed by pleating a plate-like material (into a pleated form) and forming the resultant material into a substantially tubular shape (in this case, a substantially cylindrical shape). The filtration member 131 removes dust in the fuel, and the filtration member 132 removes moisture in the fuel.

The filtration member 131 is provided with the plate 133 covering an upper side (+z side) end, and with the plate 134 covering a lower side (-z side) end. The filtration member 132 is provided with the plate 135 covering an upper side (+z side) end, and with the plate 136 covering a lower side (-z side) end. The plate 133 and the plate 135 are integrated together.

In FIG. 3, a flow of the fuel is indicated by solid arrows. The fuel guided from a fuel tank (not illustrated) to the fuel filter 1 is unfiltered. The fuel flows through an inflow path 20a (described below) into the interior of the filter case 11 (the space between the filter case 11 and the filter element 13). The case 151 is provided on the plate 134 and the filter case 11, and thus the fuel does not flow out into the reservoir section 15.

Dust and moisture are removed by the filter element 13 from the fuel having flowed into the filter case 11. The fuel filtered by the filter element 13 flows from the filter element 13 to an outflow path 20b (described below) in the head 20. The fuel having flowed out into the outflow path 20b flows out from the fuel filter 1 and is guided to an engine (not illustrated).

Water is heavier than oil, and thus the moisture removed by the filter element 13 flows out from the interior of the filter element 13 into the reservoir section 15 and collects in the case 151, as indicated by dashed arrows.

The filter element 13 is provided on the plate 12 via the mounting member 14 provided on the plates 133 and 135. The mounting member 14 is provided with the IC tag 40.

The IC tag 40 is a small electronic component that reads data from and writes data into a built-in memory in a contactless manner using radio waves received from an antenna 51a (described below).

The IC tag 40 has a substantially hollow disk shape. The mounting member 14 is inserted into a hollow portion of the IC tag 40. The IC tag 40 is provided between the plate 12 and the filtration members 131 and 132. The outer diameter of the IC tag 40 is smaller than the outer diameter of the filter case 11 or the plate 12.

Figure 4:
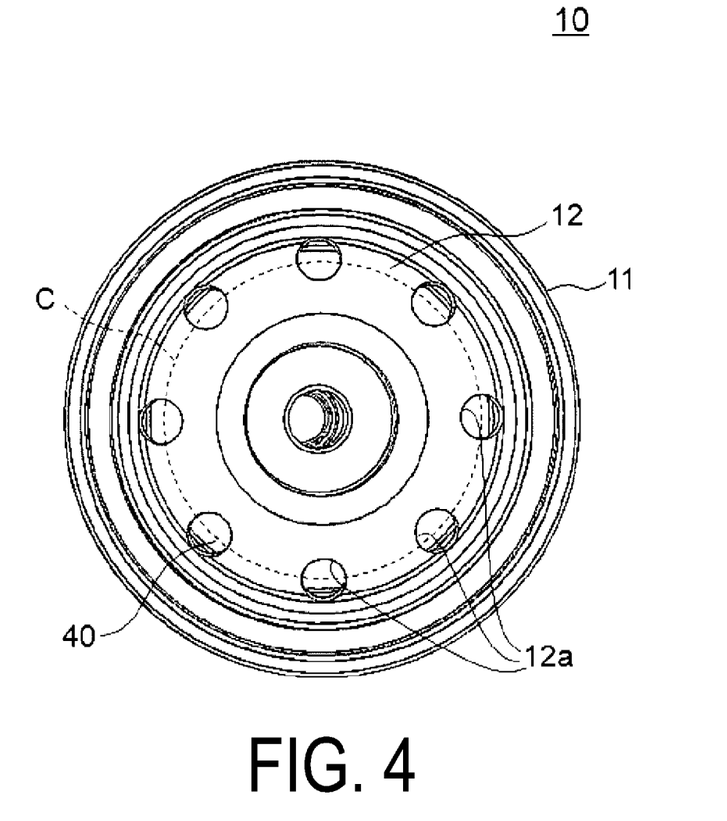
FIG. 4 is a diagram schematically illustrating a cartridge 10 as viewed from above (+z direction).

FIG. 4 is a diagram schematically illustrating the cartridge 10 as viewed from above (+z direction). A plurality of apertures 12a that expose the IC tag 40 are provided in the plate 12.

The centers of the apertures 12a are evenly disposed along a circle C centered at a center axis ax of the cartridge 10. The diameter of the circle C is greater than the inner diameter of the IC tag 40 and is smaller than the outer diameter of the IC tag 40. Thus, the IC tag 40 is exposed from the apertures 12a, and the IC tag 40 and an antenna 34 (described below in detail) communicate via the apertures 12a. However, the number and arrangement of the apertures 12a are not limited to the number and arrangement described above.

The description will now return to FIGS. 2 and 3. The head 20 is provided on the filter case 11 to cover the opening at the upper end of the filter case 11, and is formed of metal.

The head 20 is mainly provided with the inflow path 20a through which unfiltered fuel is guided to the filter element 13, and the outflow path 20b through which the fuel filtered by the filter element 13 is discharged to the exterior of the fuel filter 1.

Additionally, the head 20 is provided with an aperture 20c. The aperture 20c penetrates the head 20 (in a z-direction) along the center axis ax. The antenna unit 30 is provided in the aperture 20c. By engaging an external thread 33o of the antenna unit 30 with an internal thread, not illustrated, of the aperture 20c, the antenna unit 30 is provided in the aperture 20c. The antenna unit 30 is provided with the antenna 34 (described below in detail) that can communicate with the IC tag 40.

The head 20 is provided with a priming pump 22. The priming pump 22 is intended to let out air collected inside the cartridge 10, and is provided on a side surface of the head 20.

Figure 5:
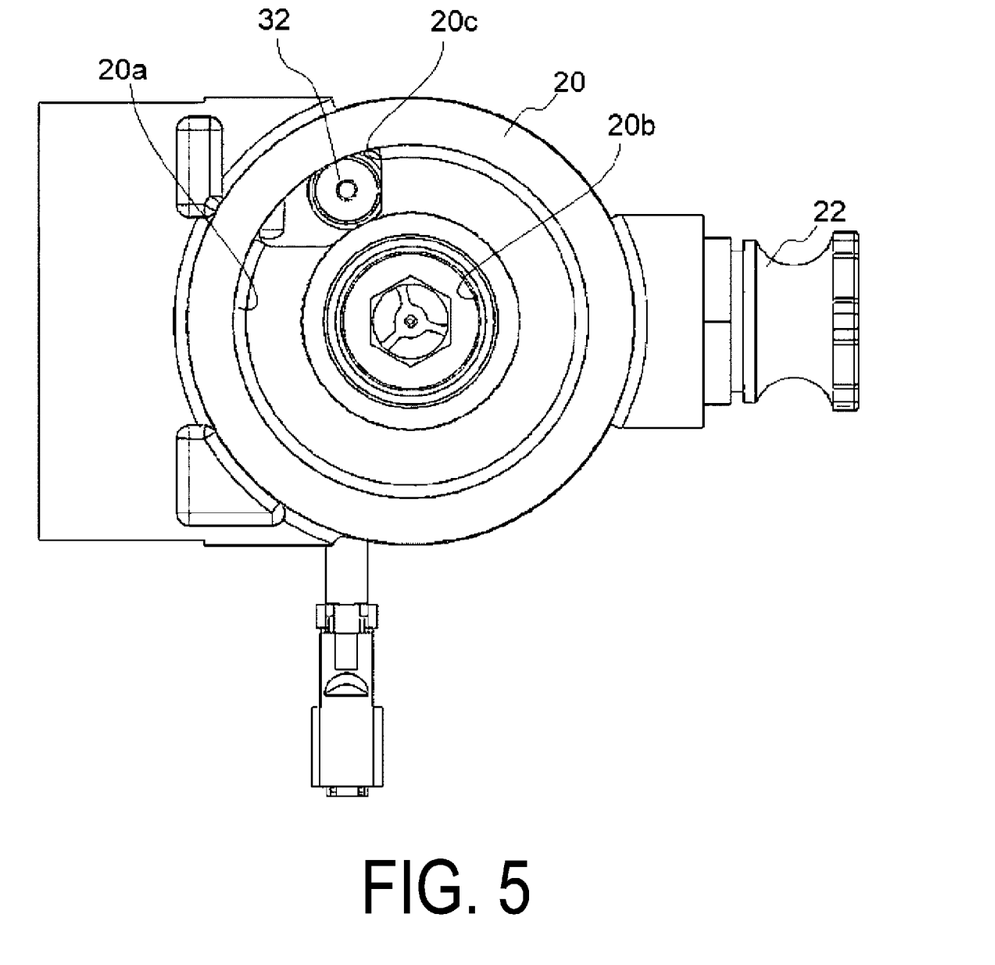
FIG. 5 is a diagram schematically illustrating a head 20 as viewed from below (-z direction).

FIG. 5 is a diagram schematically illustrating the head 20 as viewed from below (−z direction). The aperture 20c penetrates the head 20 along the z direction, and thus when the antenna unit 30 is provided in the aperture 20c, an antenna section 32 (described below in detail) is exposed from the head 20 when the head 20 is viewed from the filter case 11 side.

Figure 6:
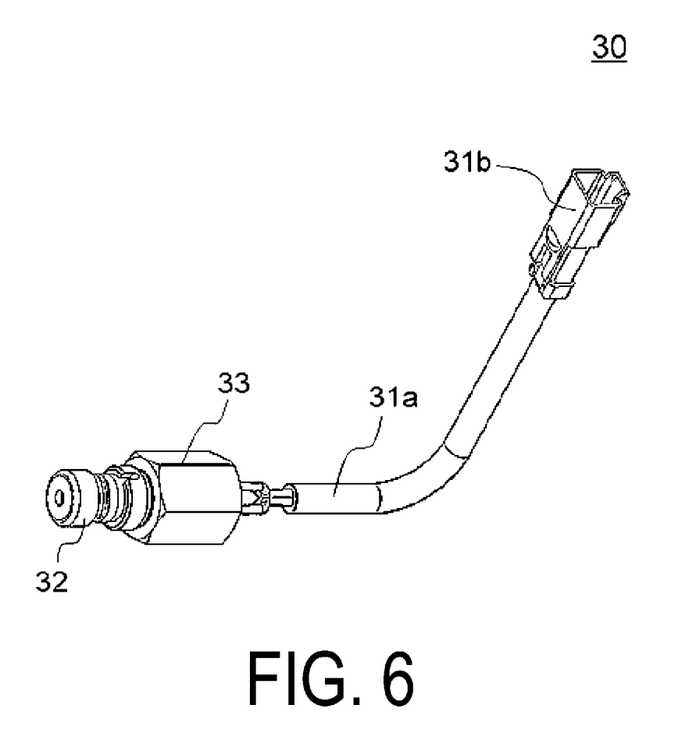
FIG. 6 is a perspective view schematically illustrating an antenna unit 30.

FIG. 6 is a perspective view schematically illustrating the antenna unit 30. The antenna unit 30 includes a case 33 having a substantially rod shape and at least partially inserted into the head 20. The case 33 is provided with a cable 31a, and the antenna unit 30 and an external device are connected via a connector 31b. The antenna section 32 is provided on a leading end side of the case 33 (the side on which the cable 31a is not provided).

Figure 7:
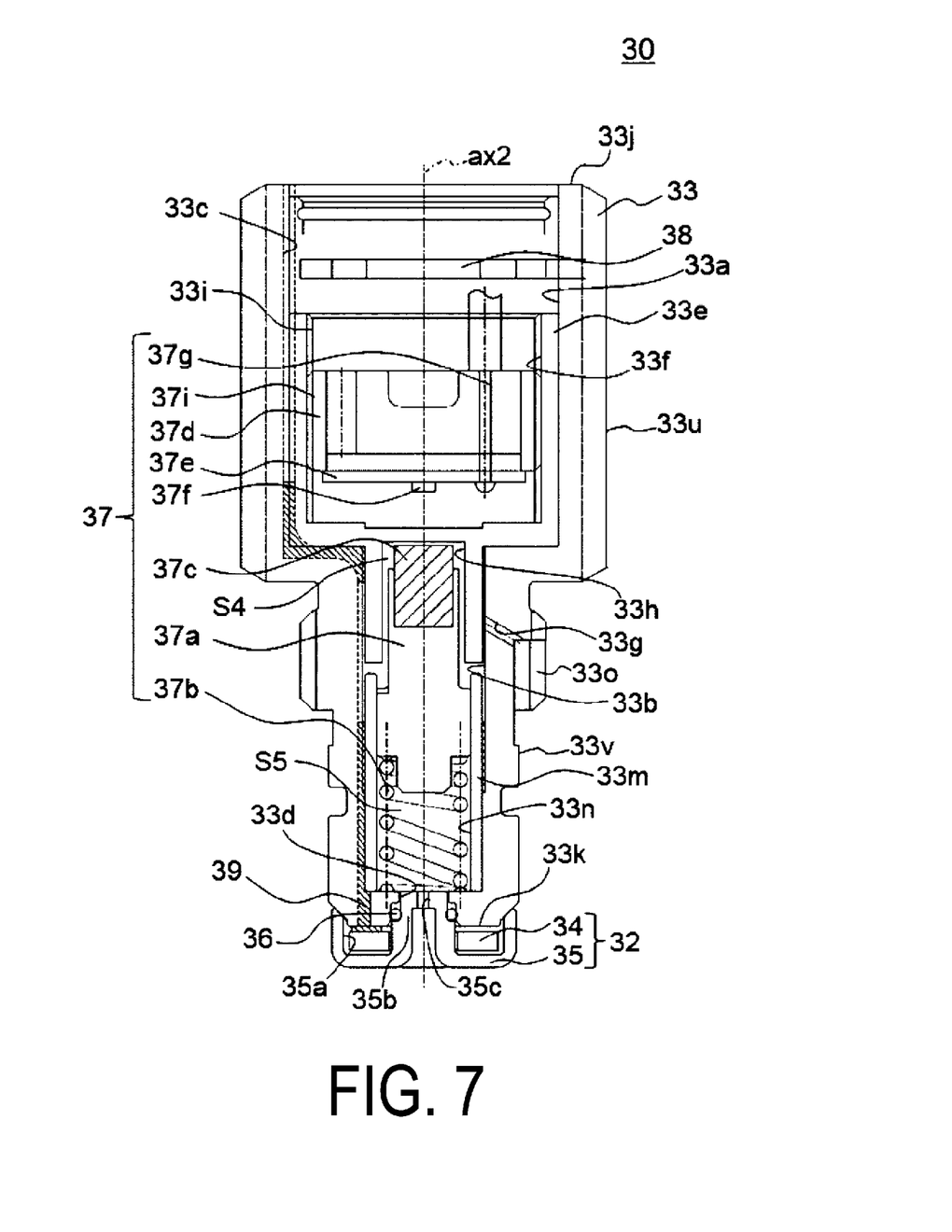
FIG. 7 is a cross-sectional view schematically illustrating the antenna unit 30.

FIG. 7 is a cross-sectional view schematically illustrating the antenna unit 30. In FIG. 7, hatching indicating a cross section is omitted. In addition, in FIG. 7, cables and the like are not illustrated.

The antenna unit 30 is primarily provided with the antenna section 32, the case 33, a differential pressure detection section 37, and a substrate 38. The antenna section 32, the differential pressure detection section 37, and the substrate 38 are provided in the case 33. The case 33 includes a large diameter portion 33u having a large diameter and a small diameter portion 33v having a smaller diameter than the large diameter portion 33u, and the small diameter portion 33v is inserted into the aperture 20c (see FIGS. 2 and 3).

The case 33 includes a hole 33a, a hole 33b, an aperture 33c, an aperture 33d, and an aperture 33g. The hole 33b opens in the hole 33a. One end of the aperture 33d opens in a bottom surface of the hole 33b, and the other end of the aperture 33d opens in an end face 33k, establishing communication between the hole 33a and the external space of the antenna unit 30. The aperture 33g penetrates the case 33 in the radial direction, and both ends of the aperture 33g respectively open in the hole 33b and in an outer peripheral surface of the case 33.

The substrate 38 is provided in the hole 33a, and an IC chip and the like, not illustrated, are mounted on the substrate 38. In response to receiving a radio wave from the IC tag 40, the substrate 38 generates a receive signal and outputs the signal via a signal line (not shown).

The case 33 is provided with the antenna section 32. The antenna section 32 is provided on an outer side of the end face 33k, that is, provided at the leading end of the case 33. In this regard, an end face 33j side of the case 33 corresponds to a root side, and the end face 33k side of the case 33, opposite to the root side, corresponds to the leading end side.

The antenna section 32 mainly includes the antenna 34 and a cover 35. The antenna 34 can communicate with the IC tag 40. The antenna section 32 is provided with one end of an antenna line, not illustrated. This antenna line is provided inside the aperture 33c, and the other end of the antenna line is provided on the substrate 38. However, the substrate 38 is not essential, and in a case where the substrate 38 is not used, the other end of the antenna line may be provided on a substrate 37e (described below in detail).

A filler 39 is provided inside the aperture 33c to cover the antenna line. The filler 39 is, for example, an adhesive containing a polymeric compound as a main component. The interior of the aperture 33c is thus filled with the filler 39 to prevent the fuel from leaking from the case 33.

The cover 35 is formed of an elastically deformable material, and includes an insertion section 35a having a substantially bottomed tube shape and internally provided with the antenna 34. Additionally, the cover 35 includes a protrusion portion 35b located in the center of the insertion section 35a and inserted into the aperture 33d.

An upper end of the insertion section 35a is open, and by inserting the protrusion portion 35b into the aperture 33d, the cover 35 is fixed to the leading end of the case 33, with the opening of the insertion section 35a covered by the case 33. Thus, the antenna 34 can be provided adjacent to the end face 33k (corresponding to a first end of the present invention), and the hydraulic oil can be prevented from contacting the antenna 34. In addition, a sealing member (e.g., an O-ring) 36 is provided between the protrusion portion 35b and the aperture 33d, and thus the antenna section 32 is fixed to the leading end of the case 33.

As illustrated in FIGS. 2 and 3, the case 33 is provided in the head 20 such that the antenna section 32 faces the plate 12 and such that the antenna 34 and the aperture 12a overlap when viewed along the center axis ax of the filter case 11. This reduces the distance between the antenna 34 and the IC tag 40, leading to more reliable communication between the antenna 34 and the IC tag 40 via the aperture 12a.

The description will now return to FIG. 7. A mounting member 33e is provided in the hole 33a, 33b. The mounting member 33e includes a hole 33f provided on the root side (the substrate 38 side), and a hole 33h provided on the leading end side (the antenna section 32 side). A detection unit 37d of the differential pressure detection section 37 is provided in the hole 33f. In other words, the differential pressure detection section 37 is provided inside the case 33 and closer to the root side of the case 33 than the antenna 34.

The differential pressure detection section 37 mainly includes a spool 37a, an elastic member 37b, a magnet 37c, and the detection unit 37d.

The spool 37a slides along an inner peripheral surface 33n of a sliding member 33m having a tubular shape and provided inside the hole 33b.

The elastic member 37b is, for example, a coil spring, and one end of the elastic member 37b is provided on the spool 37a, whereas the other end of the elastic member 37b is provided on the bottom surface of the hole 33h. The elastic member 37b applies, to the spool 37a, a force acting in a direction in which the spool 37a is pushed up.

A space S4 between the spool 37a and the hole 33h communicates with a space S2 (see FIG. 3) via the aperture 33g. A space S5 between the bottom surface of the hole 33h and the spool 37a communicates with a space S1 (see FIG. 3) via an aperture 35c in the cover 35.

The magnet 37c is provided on a surface of the spool 37a facing the bottom surface of the hole 33h, that is, provided on the detection unit 37d-side surface of the spool 37a.

By engaging an external thread portion 37i formed around the detection unit 37d with an internal thread portion 33i formed in the hole 33f, the detection unit 37d is provided in the hole 33f, enabling adjustment of the height of the detection unit 37d (position in the direction along a center axis ax2).

A leading end side of the detection unit 37d is provided with the substrate 37e. Also, the substrate 37e is provided with a magnetic field detection element 37f. The magnetic field detection element 37f is provided at a position overlapping the magnet 37c when viewed along the center axis ax2 of the case 33.

When the pressure in the space S1 (see FIG. 3) increases due to clogging or the like of the filtration members 131 and 132, the spool 37a moves toward a lower side in FIG. 7 against the urging force of the elastic member 37b. Accordingly, the magnet 37c also moves toward the lower side in FIG. 7 and away from the magnetic field detection element 37f. The magnetic field detection element 37f detects a change in magnetic flux density due to the movement of the magnet 37c. A detection result from the magnetic field detection element 37f is output to the exterior (e.g., the external device) of the antenna unit 30 via a signal line 37g with one end provided in the substrate 37e.

In a case where the differential pressure between the space S1 and the space S2 has a certain value or larger, that is, the amount of clogging of the filtration members 131 and 132 exceeds a predetermined value, the external device provides display prompting replacement of the filter element 13.

Additionally, the amount of clogging of the filtration members 131 and 132 is substantially proportional to the operating time of the filter element 13. Thus, the IC tag 40 can be used to measure the operating time of the filter element 13, and the antenna 34 can read the IC tag 40 and transmits a reading result from the antenna unit 30 to the external device. When the operating time of the filter element 13 exceeds a certain value, the external device provides display prompting replacement of the cartridge 10.

A replaced cartridge 10 is provided with an IC tag 40 different from the IC tag 40 of the original cartridge 10. By reading the IC tag 40, the operating time is also measured for the replaced cartridge 10. Additionally, by reading the IC tag 40 provided in the replaced cartridge 10, the external device can determine that a cartridge other than a predetermined one is provided. For example, in a case where an imitation or the like not provided with the IC tag 40 is used as a replaced cartridge 10, the IC tag 40 fails to be read, and thus the external device provides error display or disables the operation of the fuel filter 1.

According to the present embodiment, the cartridge 10 is provided with the IC tag 40, and the antenna unit 30 is provided with the antenna 34, and thus the IC tag 40 can be detected by attaching the antenna unit 30 to the head 20. In particular, when the antenna unit 30 is provided in the aperture 20c, the antenna section 32 is exposed from the head 20, and the plate 12 is provided with the plurality of apertures 12a from which the IC tag 40 is exposed. Thus, even in a case where metal is used for the housing including the plate 12 and the head 20, the IC tag 40 can be detected.

In addition, according to the present embodiment, the IC tag 40 has a substantially ring shape, and the centers of the apertures 12a are evenly disposed along the circle C. Thus, the antenna unit 30 can be provided at any position of the head 20. This eliminates the need for positioning of the cartridge 10 and the head 20.

In addition, according to the present embodiment, the antenna 34 is covered by the cover 35, preventing the antenna 34 from contacting the fuel to facilitate reading of the IC tag 40.

In addition, according to the present embodiment, the antenna unit 30 is provided with the differential pressure detection section 37, thus enabling measurement of the differential pressure between the space S1 and the space S2 as well as reading of the IC tag 40. Additionally, the differential pressure detection section 37 is provided closer to the root side of the case 33 than the antenna 34, thus allowing the functions of both the differential pressure detection section 37 and the antenna 34 to be achieved in a compatible manner. Consequently, by simply attaching one member (antenna unit 30) to the head 20, the measurement section and the antenna can be provided in the fuel filter 1.

Note that, in the present embodiment, the antenna unit 30 is provided with the differential pressure detection section 37, corresponding to the measurement section, but that the measurement section provided in the antenna unit 30 is not limited to the differential pressure detection section 37. Any measurement section may be provided as long as the measurement section measures the pressure or temperature of the space formed by the filter case 11 and the head 20. For example, as an embodiment for measuring pressure, a thin film-like member may be used that is provided with a strain gauge. Additionally, for example, any of various types of temperature sensors may be used as an embodiment for measuring temperature.

Second Embodiment

Figure 8:
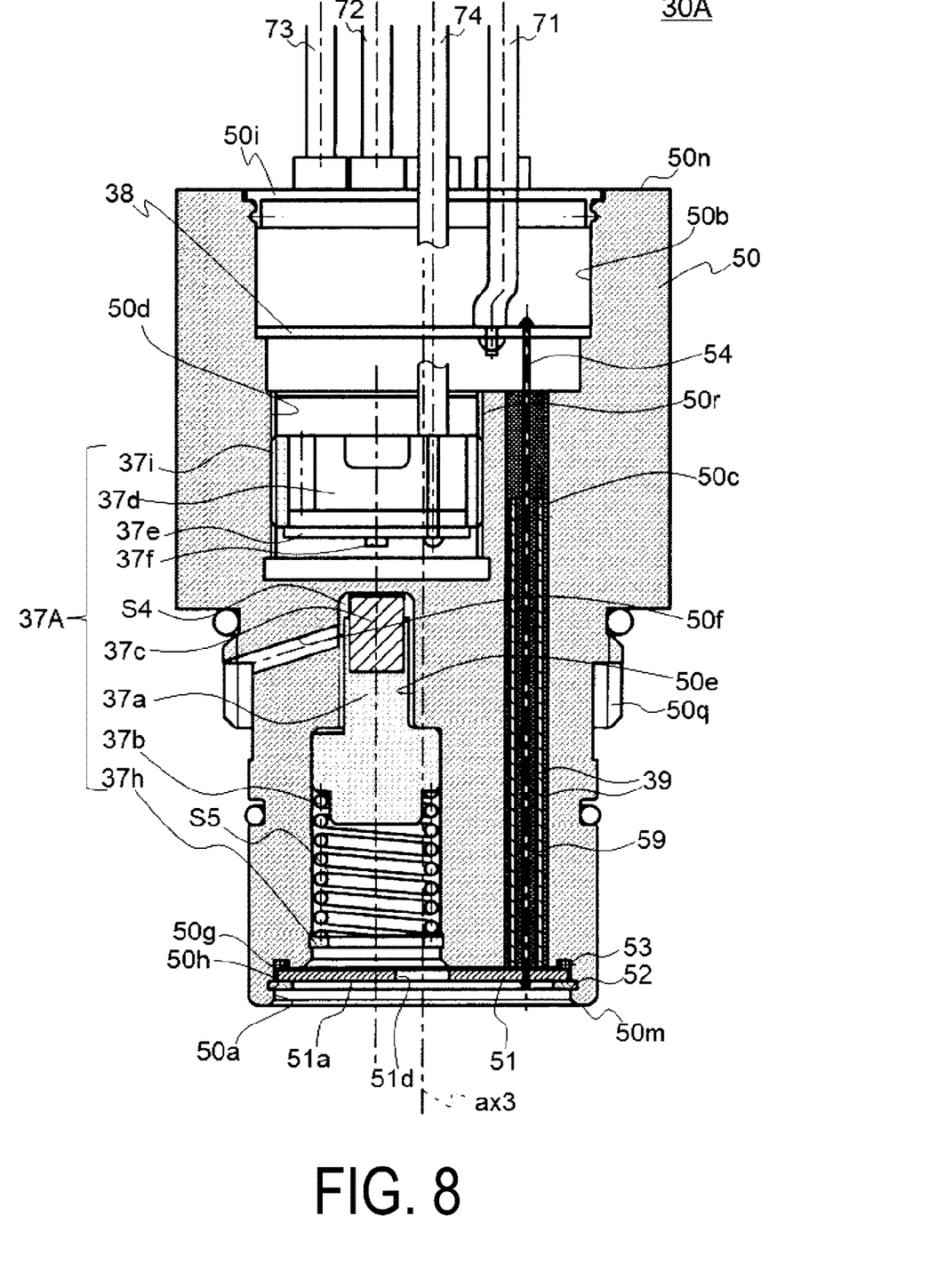
FIG. 8 is a cross-sectional view schematically illustrating an antenna unit 30A.

According to a second embodiment of the present invention, an antenna unit 30A is provided in the head 20. The first embodiment and the second embodiment differ only in the antenna unit, and thus, for the second embodiment, only the antenna unit 30A will be described. Note that the same components as those in the first embodiment are denoted by the same reference numerals, and descriptions thereof will be omitted.

FIG. 8 is a cross-sectional view schematically illustrating the antenna unit 30A. In FIG. 8, hatching indicating a cross section is partially omitted.

The antenna unit 30A mainly includes a case 50, an antenna section 51, and a differential pressure detection section 37A. The differential pressure detection section 37A mainly includes the spool 37a, the elastic member 37b, the magnet 37c, the detection unit 37d, and an E-ring 37h.

The case 50 has a substantially cylindrical shape and includes end faces 50m and 50n at respective ends of the case 50. Also, the case 50 is provided with holes 50a, 50b, 50d, and 50e, and apertures 50c and 50f. The hole 50a of the case 50 opens in the end face 50m, and the hole 50b opens in the end face 50n. Both ends of the aperture 50c respectively opens in the hole 50a and the hole 50b. The hole 50d opens in the hole 50b, and the hole 50e opens in the hole 50a. The aperture 50f penetrates the case 50 in a radial direction, and both ends of the aperture 50f respectively open in the vicinity of a bottom surface of the hole 50e and in an outer peripheral surface of the case 50.

The case 50 is provided with an external thread 50q, and by engaging the external thread 50q with an internal thread of the aperture 20c, not illustrated, the antenna unit 30A is provided in the aperture 20c.

The antenna section 51 is provided in the hole 50a. The antenna section 51 has a substantially plate shape, and has a diameter that is substantially the same as the inner diameter of the hole 50a. The antenna section 51 is provided with an aperture 51d penetrating the antenna section 51 in a thickness direction, and the hole 50e and the hole 50a communicate with each other via the aperture 51d.

A bottom surface of the hole 50a is provided with a recessed portion 50g, and a sealing member (an O-ring) 53 is provided in the recessed portion 50g. Additionally, a side surface of the hole 50a is provided with a recessed portion 50h, and a retainer ring 52 is provided in the recessed portion 50h. The sealing member 53 has elasticity, and the sealing member 53 presses the antenna section 51 toward the retainer ring 52 side to provide the antenna section 51 inside the hole 50a. A depth of the hole 50a is shorter than a radius of an opening of the hole 50a.

The antenna 51a is provided on the end face 50m-side surface of the antenna section 51. In other words, the antenna 51a is provided adjacent to the end face 50m (corresponding to the first end of the present invention). The antenna 51a is a wiring pattern (antenna coil pattern) formed on one surface of the antenna section 51, and both ends of the antenna 51a connect to respective antenna lines 54.

The antenna section 51 is provided inside the hole 50a such that the antenna 51a is exposed from the opening of the hole 50a. Accordingly, when the antenna unit 30A is provided in the head 20 (see FIGS. 2 and 3), the antenna 51a is exposed from the head 20 when the head 20 is viewed from the filter case 11 (see FIGS. 2 and 3). Additionally, the case 50 is provided in the head 20 such that the antenna section 51 (in this regard, the antenna 51a) faces the plate 12 (see FIGS. 2 and 3) and that the antenna 51a and the aperture 12a (see FIG. 4) overlap when viewed along the center axis ax of the filter case 11. Consequently, the distance between the antenna 51a and the IC tag 40 can be reduced, enabling more reliable communication between the antenna 51a and the IC tag 40 via the aperture 12a.

The case 50 is provided with two apertures 50c adjacent to each other, and the antenna lines 54 are provided in the respective apertures 50c. The substrate 38, used as an IC tag reader substrate, is provided in the hole 50b. One end of the antenna line 54 is provided in the antenna section 51, and the other end is provided on the substrate 38. Output from the substrate 38 is provided to the exterior of the antenna unit 30 via a signal line 71.

The filler 39 is provided inside the aperture 50c to cover the antenna line 54, and an insulating pipe 59 is provided outside the filler 39. Additionally, the filler 39 is provided to cover the insulating pipe 59. As described above, the inside of the aperture 50c is filled with the filler 39 to prevent a liquid from leaking from the aperture 50c to the hole 50d. Note that in the present embodiment, the insulating pipe 59 is provided separately from the antenna line 54, but the insulating pipe 59 is not required as long as the antenna line 54 includes an insulating function.

The detection unit 37d is provided in the hole 50d. The aperture 50c and the hole 50d are disposed to avoid overlapping when viewed along a center axis ax3 of the case. By engaging the external thread portion 37i with an internal thread portion 50r, the detection unit 37d is provided inside the hole 50d, enabling the height of the detection unit 37d (the position in a direction along the center axis ax3) to be adjusted.

The spool 37a, the elastic member 37b, and the magnet 37c are provided inside the hole 50e. The aperture 50c and the hole 50e are disposed to avoid overlapping when viewed along the center axis ax3 of the case.

The spool 37a is slidable inside the hole 50e, and divides the hole 50e into the space S4 and the space S5. The space S4 communicates with the space S1 via the aperture 50f. The space S5 communicates with the space S2 via the hole 50a and the aperture 51d. The elastic member 37b applies, to the spool 37a, a force acting from the space S5 toward the space S4.

An increased pressure in the space S1 (space S4) moves the spool 37a toward the end face 50m against the urging force of the elastic member 37b. Accordingly, the magnet 37c also moves to the end face 50m side and away from the magnetic field detection element 37f. The magnetic field detection element 37f detects a change in magnetic flux density due to the movement of the magnet 37c. A detection result from the magnetic field detection element 37f is output to the exterior of the antenna unit 30 via a signal line 74 with one end provided in the substrate 37e.

The signal line 71 and power cables 72 and 73 are provided adjacent to the signal line 74. The signal lines 71 and 74 and the power cables 72, 73 penetrate a cover 50i covering the hole 50b. The power cables 72 and 73 supply power to the substrate 37e and the substrate 38, and are connected to the substrate 37e and the substrate 38 (not illustrated). This allows the set of power cables 72 and 73 to supply power to the two substrates (substrate 37e and substrate 38), enabling space saving.

According to the present embodiment, the antenna 51a is exposed from the opening on the leading end side (end face 50m side) of the antenna unit 30A. Thus, by providing the antenna unit 30A in the head 20, the antenna 51a is exposed from the head 20, allowing information recorded in the IC tag 40 to be accurately read even in a case where the head 20 is made of metal.

Additionally, according to the present embodiment, the differential pressure detection section 37A provided in the antenna unit 30 allows measurement of the differential pressure between the space S1 and the space S2 as well as reading of the IC tag 40.

Modified Examples

Note that, in the embodiments described above, the antenna units 30 or 30A is provided in the fuel filter 1, used as an example of the filter device. However, the antenna unit 30 or 30A is not necessarily provided in the fuel filter 1. For example, the antenna unit 30 or 30A can be provided in any of various filter devices such as a return filter, a urea water filter, and an air breather. Note that the air breather includes a built-in filtration member and is thus counted as a filter device.

First, a modified example will be described in which the antenna unit 30 or 30A is provided in a return filter or a urea water filter. The return filter or urea water filter mainly includes a filter case, a head, a filter element, and an IC tag. The filter case has a substantially tubular shape, and includes an opening at an upper end of the filter case. A lower end of the filter case is covered. A filter element with plates provided on an upper side and a lower side of a filtration member is provided inside the filter case. The plate (upper plate) provided on the upper side of the filtration member is made of metal. The upper plate is provided near the opening of the upper end of the filter case. An IC tag is provided between the filtration member and the upper plate, and the upper plate is provided with one or a plurality of apertures from which the IC tag is exposed. The head covering the opening of the upper end of the filter case is made of metal, and the head is provided with an antenna unit.

Now, a modified example will be described in which the antenna unit 30 or 30A is provided in an air breather. The air breather primarily includes a case, a head, a filter element, and an IC tag. The filter case has a substantially tubular shape, and includes an opening at a lower end of the filter case. An upper end is covered. A filter element with plates provided on an upper side and a lower side of a filtration member is provided inside the filter case. The plate (lower plate) provided on the lower side of the filtration member is made of metal. The lower plate is provided near the opening of the upper end of the filter case. An IC tag is provided between the filtration member and the lower plate, and the lower plate is provided with one or a plurality of apertures from which the IC tag is exposed. The head covering the opening of the lower end of the filter case is made of metal, and the head is provided with an antenna unit.

Additionally, in the embodiments described above, the plate 12 is provided with the plurality of apertures 12a but may be provided with one aperture 12a. For example, in a case where the cartridge 10 and the head 20 are positioned in a circumferential direction, the plate 12 may be provided with one aperture 12a. The plate 12 may also be provided with one aperture 12a in a case where the IC tag 40 has a long communication distance.

Additionally, in the embodiments described above, the central axes ax2 and ax3 of the cases 33 and 50 of the antenna units 30 and 30A are substantially parallel to the center axis ax of the filter case 11, and the antenna unit 30 or 30A is provided in the head 20 such that the antenna section 32 or 51 faces the plate 12. However, the antenna units 30 and 30A are not limited to this arrangement. The central axes ax2 and ax3 need not be substantially parallel to the center axis ax. For example, in a case where the antenna unit 30 or 30A is provided in a return filter, a urea water filter, an air breather, or the like, the central axes ax2 and ax3 may be substantially orthogonal to the center axis of the filter case.

Additionally, the antenna unit 30 or 30A is provided in the head 20 such that the antenna 34 or 51a and the aperture 12a overlap when viewed along the center axis ax. However, the antenna 34 or 51a and the aperture 12a need not overlap. However, for increased accuracy of sensing, desirably, the distance between the antenna 34 or 51a and the IC tag 40 is reduced, i.e., when viewed along the central axis ax, the antenna unit 30 or 30A is provided in the head 20 such that the antenna 34 or 51a and the aperture 12a overlap. Additionally, for increased accuracy of sensing, the antenna 34 or 51a desirably faces the plate 12 (i.e., the IC tag 40).

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

In addition, the term "substantially" is not to be understood as merely being strictly the same, and is a concept that includes errors and modifications to an extent that does not result in loss in identity. For example, the "substantially cylindrical shape" is a concept that includes a case where, for example, the shape can be placed in the same category as the cylindrical shape, and is not strictly limited to the cylindrical shape. Further, simple expressions such as orthogonal, parallel, and identical are not to be understood as merely being strictly, for example, orthogonal, parallel, and identical, and include being, for example, substantially parallel, substantially orthogonal, and substantially identical.

In addition, the term "vicinity" means to include a range of regions (which can be determined as desired) near a position serving as a reference. For example, the term "a vicinity of an end" refers to a range of regions in the vicinity of the end, and is a concept indicating that the end may or need not be included.

REFERENCE SIGNS LIST

1: Fuel filter
10: Cartridge
11: Filter case
12: Plate
12a: Aperture
13: Filter element
14: Mounting member
15: Reservoir section
20: Head
20a: Inflow path
20b: Outflow path
20c: Aperture
22: Priming pump
30, 30A: Antenna unit
31a: Cable
31b: Connector
32: Antenna section
33: Case
33a, 33b, 33f, 33h: Hole
33c, 33d, 33g: Aperture
33e: Mounting member
33i: Internal thread portion
33j, 33k: End face
33m: Sliding member
33n: Inner peripheral surface
33o: External thread
33u: Large diameter portion
33v: Small diameter portion
34: Antenna
35: Cover
35a: Insertion section
35b: Protrusion portion
35c: Aperture
37, 37A Differential pressure detection section
37a: Spool
37b: Elastic member
37c: Magnet
37d: Detection unit
37e: Substrate
37f: Magnetic field detection element
37g: Signal line
37h: E-ring
37i: External thread portion 38: Substrate
39: Filler
40: IC tag
50: Case
50a, 50b, 50d, 50e: Hole
50c, 50f: Aperture
50g, 50h: Recessed portion
50i: Cover
50m, 50n: End face
50q: External thread
50r: Internal thread portion
51: Antenna section
51a: Antenna
51d: Aperture
52: Retainer ring
53: Sealing member
54: Antenna line
59: Insulating pipe
71: Signal line
72, 73: Power cable
74: Signal line
131, 132: Filtration member
133, 134, 135, 136: Plate
151: Case
152: Float
153: Drain plug

The invention claimed is:

1. A filter device comprising:
a filter case having a tubular shape and comprising an opening at an upper end or a lower end of the filter case, with an other end being covered;
a head made of metal and provided in the filter case to cover the opening;
a filtration member having a tubular shape and provided in an internal space formed by the filter case and the head;
a plate made of metal and provided near the opening of the filter case;
an IC tag provided between the filtration member and the plate; and
an antenna unit provided in the head and provided with an antenna section comprising an antenna configured to communicate with the IC tag, wherein
the antenna unit comprises a case having a rod shape and inserted into the head,
the antenna section is provided at a first end corresponding to one end of the case,
the case is provided in the head such that the antenna section is exposed when the head is viewed from a side of the filter case,
the plate is provided with an aperture from which the IC tag is exposed,
the IC tag has a hollow disk shape,
the plate is provided with a plurality of the apertures, and
centers of the plurality of apertures are evenly arranged along a circle centered at a center axis of the filter case and having a diameter larger than an inner diameter of the IC tag and smaller than an outer diameter of the IC tag.

2. The filter device according to claim 1, wherein
the antenna has a plate shape, and
the case is provided in the head such that the antenna section faces the plate and that the antenna and the aperture overlap when viewed along a center axis of the filter case.

3. The filter device according to claim 2, wherein
the filter case is made of metal,
the plate is provided to cover the opening, and
the filter case, the filtration member, the plate, and the IC tag are integrated together and are detachable from the head.

4. The filter device according to claim 2, wherein
the antenna unit comprises a measurement section measuring a pressure or temperature of a space formed by the filter case and the head, and
the measurement section is provided inside the case and closer to a root side of the case than the antenna.

5. The filter device according to claim 1, wherein
the filter case is made of metal,
the plate is provided to cover the opening, and
the filter case, the filtration member, the plate, and the IC tag are integrated together and are detachable from the head.

6. The filter device according to claim 5, wherein
the antenna unit comprises a measurement section measuring a pressure or temperature of a space formed by the filter case and the head, and
the measurement section is provided inside the case and closer to a root side of the case than the antenna.

7. The filter device according to claim 2, wherein
the antenna unit comprises a cover made of an elastically deformable material,
the cover comprises an insertion section having a bottomed tube shape and the antenna is disposed inside the insertion section, and
the case is configured to cover an opening of the insertion section.

8. The filter device according to claim 5, wherein
the antenna unit comprises a cover made of an elastically deformable material,
the cover comprises an insertion section having a bottomed tube shape and the antenna is disposed inside the insertion section, and
the case is configured to cover an opening of the insertion section.

9. The filter device according to claim 1, wherein
the antenna unit comprises a measurement section measuring a pressure or temperature of a space formed by the filter case and the head, and
the measurement section is provided inside the case and closer to a root side of the case than the antenna.

10. The filter device according to claim 9, wherein
the antenna unit comprises a cover made of an elastically deformable material,
the cover comprises an insertion section having a bottomed tube shape and the antenna is disposed inside the insertion section, and
the case is configured to cover an opening of the insertion section.

11. The filter device according to claim 1, wherein
the antenna unit comprises a cover made of an elastically deformable material,
the cover comprises an insertion section having a bottomed tube shape and the antenna is disposed inside the insertion section, and
the case is configured to cover an opening of the insertion section.

12. The filter device according to claim 1, wherein:
the antenna section has a plate-shape having a first surface and a second surface facing away from one another;
on the first surface, a wiring pattern as the antenna is formed;

the antenna section is accommodated in an antenna accommodation hole disposed on the end of the first end corresponding to the one end of the case;
the second surface of the antenna section faces against a bottom surface of a hole of the filter case;
and a depth of the antenna accommodation hole is shorter than a radius of an opening of the antenna accommodation hole.

\* \* \* \* \*